United States Patent Office 2,827,378
Patented Mar. 18, 1958

2,827,378

METHOD OF PREPARING BAKERY PRODUCTS

Elmer F. Glabe, Chicago, Ill., assignor to Food Technology, Inc., Chicago, Ill., a corporation of Illinois No Drawing. Application June 25, 1953
Serial No. 364,186

6 Claims. (Cl. 99—90)

This invention relates to the preparation of bakery products from fermented doughs, more particularly white bread, buns and rolls.

The present application is a continuation-in-part of my copending application, Serial No. 114,685, filed September 8, 1949, which in turn is a continuation-in-part of my application Serial No. 45,561, filed August 21, 1948, now abandoned, and the disclosures of the aforesaid applications are incorporated herein and made a part hereof by reference as fully as if they had been set forth herein in their entireties.

One of the objects of the present invention is to produce bakery products from fermented doughs, more particularly white bread, buns and rolls, having a soft crumb texture.

Another object of the invention is to provide new and improved bakery products such as white bread, buns and rolls having a crisp and tender crust.

A further object of the invention is to provide new and improved bakery products such as white bread, buns and rolls which are characterized by the fact that they will retain a soft crumb texture over a relatively long period of time.

Another object of the invention is to provide a new and improved method for preparing bakery products from fermented doughs such as white bread, buns and rolls. Other objects will appear hereinafter.

In accordance with the invention it has been found that hydroxylated phosphatides, when incorporated in the proper manner with ingredients used in making fermented doughs, make it possible to produce baked products such as white bread, buns and rolls which have a softer crumb texture than ordinary white bread, buns and rolls made without the hydroxylated phosphatide and retain this softness for a much longer time than is usual for such bakery products.

The hydroxylated phosphatides are made by treating phosphatides under conditions that bring about hydroxylation of the phosphatide. Phosphatides have the general formula

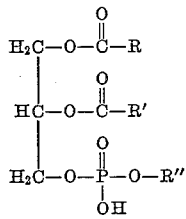

where R and R' are the hydrocarbon radicals of the higher fatty acids, some of which are unsaturated and R" is either a choline radical, a cholamine radical or a serine radical. The phosphate radical may occupy either the alpha or beta position. In the lecithins, R" is the choline radical, and in the cephalines R" is the cholamine radical.

It has been found that hydroxylation of such molecules at a double bond of the unsaturated fatty acids can be accomplished by treating the phosphatides with hydrogen peroxide, preferably in the presence of a water soluble aliphatic carboxylic acid, e. g., acetic, lactic, citric, tartaric, and the like, or with the peracids of such water soluble aliphatic carboxylic acids, e. g., peracetic, perlactic, and the like. Mineral acids such as sulfuric and phosphoric acids can also be used. As indicated, it is preferred to treat either with a mixture of hydrogen peroxide and edible acids or with the peracid of an edible acid since the reaction is more economical and a greater degree of hydroxylation can be obtained. However, hydrogen peroxide alone produces beneficial results. When acid conditions are employed, it is preferred not to use such an amount as will result in a pH value below 3 for a 1% aqueous solution of the mixture, since the phosphatides are easily decomposed under severe acid conditions. Greater amounts of acid may be used, however, where a greater degree of hydroxylation and water solubility are desired, although there is the danger of some decomposition taking place.

The resulting product has a decreased unsaturation as measured by the iodine value, indicating hydroxylation. The product has been hydrolyzed and acetyl values determined on the fatty acids recovered. These show a substantial increase in acetyl values over the acids recovered from the untreated phosphatides, and clearly indicate that hydroxylation occurs on the fatty acid portion. Dihydroxystearic acid has also been recovered from the hydrolysate of the treated material.

According to one method of procedure in preparing the hydroxylated phosphatides, the phosphatide is mixed with an acid, preferably an edible acid such as acetic acid, and warmed to a temperature above about 40° C., but below the temperature at which substantial decomposition of the phosphatide occurs. This latter temperature can readily be determined by routine experiment but in practice it is preferable not to heat the mixture above about 70° C. If crude soybean lecithin is used as the phosphatide it can be heated until it melts. The mixture of the phosphatide and acid is then mixed with hydrogen peroxide with agitation while maintaining a temperature below the decomposition temperature of the phosphatide. Thereafter it is desirable to neutralize the resultant product with an alkali, preferably sodium hydroxide. Finally, the product is dried under vacuum or in any other suitable manner. If the product is not neutralized at least a portion of the hydroxyl groups will be esterified by the acid used to accelerate and increase the extent of the hydroxylation. The preferred practice of the invention is to neutralize the product in order to remove any excess hydrogen peroxide and at the same time the neutralization hydrolyzes the ester groups to produce hydroxylated phosphatides in which hydroxyl groups are on adjacent carbon atoms of the fatty acid portion of the phosphatide. These products have proved to be especially valuable in the practice of the invention.

The preparation of hydroxylated phosphatides is described in several patents, including, for example, Wittcoff, U. S. Patent 2,445,948, and Julian et al., U. S. Patent 2,629,662. The use of hydroxylated phosphatides in the preparation of amylaceous compositions is described in my U. S. Patent 2,513,638, and the use of hydroxylated phosphatides in the preparation of meat products is described in my U. S. Patent 2,635,963. The treatment of phosphatides such as lecithin with hydrogen peroxide per se is disclosed in Bollmann and Schwieger, U. S. Patent 1,893,393.

For the purpose of the invention, the phosphatide materials are preferably hydroxylated until the iodine value is reduced from 5% to 25%, the optimum hydroxylation being a reduction in iodine value around 10%.

In the practice of the invention it has been found that especially desirable results are obtained by mixing the phosphatide with an amylaceous substance before incorporating it into the dough employed in making bread, buns, rolls or other fermented products. The amylaceous substance which may be employed for this purpose can be a part of the flour which would normally be employed in the preparation of the dough or it can be another amylaceous substance preferably having a relatively high water absorptive capacity, as, for example, potato, wheat, rye, barley, oat, rice, corn, sweet potato, sago and cassava starches and flour. In general, such starches and flours will have a free moisture content of at least 8% moisture and usually between 15% and 20% moisture. The presence of the moisture apparently activates the hydrophilic portion of the hydroxylated phosphatide and results in more complete dispersion of the hydroxylated phosphatide in the dough batch. If the hydroxylated phosphatide is merely added as such to the dough batch it will come into contact with salt and other ingredients which have an inhibiting effect upon the emulsifying action of the hydroxylated phosphatide. In this case, the results obtained are much less desirable than those obtained when the hydroxylated phosphatide is first mixed with an amylaceous substance and then incorporated into the dough batch.

The proportions of the hydroxylated phosphatide employed for the purpose of the invention are preferably rather small and the best results have been obtained by using 0.025% to 0.5% by weight of the hydroxylated phosphatide based on the weight of the total flour employed in the preparation of the dough batch. The proportions initially mixed with an amylaceous substance prior to incorporating the mixture of amylaceous substance and hydroxylated phosphatide into the dough batch may be much higher but usually will not exceed 5% by weight of the amylaceous substance.

Where the hydroxylated phosphatide is incorporated with a starchy polysaccharide before adding it to the dough batch, it is sometimes desirable to add a small amount of water in order to enhance the activating effect of the water. This is especially true where the moisture content of the amylaceous substance is relatively low. I have found that the addition of as much as 5% water is sometimes advantageous.

The invention will be further illustrated but is not limited by the following examples in which the quantities are stated by weight unless otherwise indicated.

*Example I*

A typical method of making bread by the sponge and dough method consists in preparing a sponge from the following ingredients:

360 grams Spring Wheat Patent Flour
12 grams yeast
1.25 grams yeast food
216 cc. water The sponge is prepared by mixing 3 minutes and fermenting at 80° F. for 3½ hours. The following ingredients are then added together:

240 grams Winter Wheat Patent Flour
18 grams sugar
18 grams powdered skim milk
24 grams lard
12 grams salt
100 cc. water This second addition is called the "dough" stage. After mixing for 3 minutes the mixture is fermented for 20 minutes at 80° F. and then divided into two portions of 250 grams each, molded and placed in pans. The molded pieces are retained at a temperature of 95° F. for 50 minutes at a relative humidity of about 90%. The dough is then baked at 425° F. for 30 minutes. The bread produced by this method has good texture but suffers the usual limitations of poor keeping qualities and has a tendency to become hard during storage thereby diminishing its saleability.

In accordance with the present invention 2.16 grams of a hydroxylated phosphatide made by mixing soybean lecithin with an acid such as acetic acid or lactic acid followed by neutralization with a 10% solution of sodium hydroxide, the conditions being such that the iodine value of the lecithin is reduced approximately 10%, is suspended on 50 grams of the flour which would normally be added in the dough stage. This is accomplished by mixing the hydroxylated phosphatide with the flour. The resultant mixture is then added in the dough stage.

The same hydroxylated phosphatide can be added as such during the dough stage and the resultant baked product when compared with the control to which no hydroxylated phosphatide has been added will not have a softer crumb texture than the control. However, when the hydroxylated phosphatide is first suspended on an amylaceous substance and then introduced into the dough batch, the crumb texture of the baked product is softer than either the control or the baked product made by the introduction of the hydroxylated phosphatide per se to the dough batch.

The explanation for this difference and for the improvement obtained by first suspending the hydroxylated phosphatide on the amylaceous substance is apparently the presence of electrolytes in the ingredients used in the dough batch which have a tendency to inhibit the emulsifying action of the hydroxylated phosphatide.

To illustrate this inhibition 2.16 grams of the aforementioned hydroxylated phosphatide were mixed with the 12 grams of salt and the mixture incorporated into the dough batch after which the bread was processed and baked in the same manner as the control. The bread obtained in this manner had a very poor softness of crumb texture and was not as soft as the control. Thus, it appears that if the hydroxylated phosphatide is put into the dough batch before it is dispersed on an amylaceous substance it may come in contact with electrolytes such as sodium chloride, which have an adverse effect on the softness and keeping qualities of the final product.

*Example II*

To illustrate further the effect of salts on the emusifying action of the hydroxylated phosphatide a series of tests were carried out as follows:

A control sample was prepared by mixing 0.5 gram of a hydroxylated phosphatide as described in Example I with 25 cc. of distilled water for 45 seconds in a stoppered glass tube. The tube was examined immediately and again after standing one hour. In both cases a good continuous white suspension was observed.

A similar experiment was performed except that 0.5 gram of sodium chloride was added to the mixture. In this case a fair emulsion was formed at first but after standing one hour the emulsion had broken and three distinct layers were visible. Essentially the same results were obtained by substituting 0.5 gram of ammonium chloride for the sodium chloride.

When 0.5 gram of calcium chloride, magnesium chloride or magnesium sulfate was substituted for the sodium chloride no emulsification was obtained, either immediately or after one hour.

When Chicago tap water was used in preparing a suspension containing 0.5 gram of the hydroxylated phosphatide and 25 cc. of water fair emulsification was observed, but after one hour the emulsion had separated.

The foregoing tests indicate that electrolytes interfere with the emulsifying action of the hydroxylated phosphatide if they are present initially during the emulsification.

To evaluate further the effect of electrolytes, 0.5 gram of the hydroxylated phosphatide was mixed with 10 grams of hard wheat flour and shaken with 60 cc. of distilled water for 45 seconds. The resultant mixture was observed to be a milky suspension of an emulsifier and flour. After standing for one hour a milky suspension of some of the emulsifier was still visible and some of the flour had settled out.

The same test was carried out except that 0.5 gram of sodium chloride was added and the result was essentially the same. Thus, the mixture of the hydroxylated phosphatide suspended on flour produced an emulsion even in the presence of the sodium chloride and the hydroxylated phosphatide remained in suspension on standing, there being no significant interference or inhibition by the sodium chloride when the hydroxylated phosphatide was first dispersed on the flour.

*Example III*

This example illustrates another test which indicates that the hydroxylated phosphatide affects the rate in degree of the gelatinization of starch suspensions and thereby makes bread softer and keeps it softer over a longer period of time than is possible without the hydroxylated phosphatide.

These tests were made on a Brabender amylograph which records the rate and degree of gelatinization of starch suspension. The temperature of the suspension is raised at a uniform rate and at the same time a curve is plotted in amylogram units over a period of 40 minutes. The peak of the curve indicates the amount of the viscosity exhibited by the suspension with a standard quantity of water. The degree of gelatinization is highest at the peak of the curve.

The amylograph has been used to show that such known bread softeners as polyoxyethylene monostearate very substantially increases the height of the amylograph curve. It is believed that this indicates the degree of the action on the starch and the extent to which the crumb texture of the bread is softened and remains soft.

The following comparative tests show the substantial differences obtained by using various substances as compared to polyoxyethylene monostearate and a control to which no additions were made:

| Ingredients | Amylogram Units at Peak of Curve |
|---|---|
| Flour only (control) | 525 |
| Flour plus 0.40% by weight of the flour of polyoxyethylene monostearate | 660 |
| Flour plus 0.40% hydroxylated phosphatide made from expeller-type soya oil | 650 |
| Flour plus 0.40% hydroxylated phosphatide made from solvent-type soya oil | 585 |
| Flour plus 0.40% regular single bleach soya lecithin | 545 |

The quantity of 0.40% used in these tests was chosen because this appears to be approximately the optimum amount for the best results with hydroxylated phosphatide. The quantity used in Example I corresponds to 0.36% by weight of the flour. Quantities above about 0.5% of the hydroxylated phosphatide are less desirable because of the tendency to produce a reduction in the volume of the loaf.

It is apparent from these tests that hydroxylated phosphatide increases the rate of degree of gelatinization to substantially the same extent as polyoxyethylene monostearate which is known to produce a softening of the crumb texture of bread. Thus, if it is assumed that the softness of the crumb texture of bread is due at least in part to the rate of degree of gelatinization of the flour, then the action of the hydroxylated phosphatide as shown by the foregoing amylograph tests produces a substantially similar result to that obtained with the polyoxyethylene monostearate but without the disadvantages attributed to the use of the polyoxyethylene monostearate.

The invention is generally applicable to the preparation of baked products made from fermented doughs containing starchy polysaccharides, including white bread, buns, rolls, coffee cake and other products made from yeast raised doughs. The term "starchy polysaccharides" is used herein to cover starches and cereal flours, including, for example, wheat, rye, barley, oat, rice, corn, sweet potato, potato, sago and cassava starches and flours.

White bread, buns and rolls prepared in accordance with the practice of the invention will retain a soft crumb texture over a substantially long period of time. Loaves of bread made in accordance with the practice of the invention, wrapped in wax paper and stored at 85° F. for five days showed a remarkable softness of crumb texture, whereas standard bread made under like conditions but without the hydroxylated phosphatide had a much harder texture. The products made in accordance with the invention are also characterized by a crisp and tender crust. Additionally, a soft crumb texture may be obtained even though the amount of shortening in the standard bread formula given in Example I is reduced. For example, I may use 12 grams of lard instead of the 24 grams and still obtain a bread having a soft crumb texture.

Although I have obtained the best results in the practice of the invention by employing a hydroxylated phosphatide having an iodine value approximately 5 to 25% lower than the corresponding unhydroxylated phosphatide, it wll be understood that the hydroxylated phosphatide can have its iodine value reduced as much as 50% or more by the hydroxylation of the double bonds of the unsaturated fatty acid portion of the phosphatide.

The invention is hereby claimed as follows:

1. A method of making bakery products from fermented doughs which comprises incorporating with the baking mix a hydroxylated phosphatide intimately mixed with a starchy polysaccharide, forming a fermented dough from the resultant mixture, and baking said dough.

2. In a method of making bakery products from fermented doughs the step which comprises incorporating with a fermented dough a starchy polysaccharide intimately mixed with a hydroxylated phosphatide, the quantity of hydroxylated phosphatide corresponding to 0.025% to 0.5% by weight of the total starchy polysaccharide used in making said dough.

3. A method of making bakery products from fermented doughs which comprises incorporating with a fermented dough a starchy polysaccharide intimately mixed with a hydroxylated phosphatide, the quantity of hydroxylated phosphatide corresponding to 0.025% to 0.5% by weight of the starchy polysaccharide in said dough and said hydroxylated phosphatide having an iodine value from 5% to 50% lower than the corresponding unhydroxylated phosphatide.

4. A method of making bakery products from fermented doughs which comprises incorporating with a fermented dough a starchy polysaccharide inimately mixed with a hydroxylated phosphatide, the quantity of hydroxylated phosphatide corresponding to 0.025% to 0.5% by weight of the starchy polysaccharide in said dough and said hydroxylated phosphatide having an iodine value from 5% to 25% lower than the corresponding unhydroxylated phosphatide.

5. In a method of making bakery products from fermented doughs the step which comprises incorporating with a baking mix containing yeast a starchy polysaccharide intimately mixed with a hydroxylated phosphatide, the quantity of hydroxylated phosphatide corresponding to 0.025% to 0.5% by weight of the starchy polysaccharide in said baking mix and said hydroxylated phosphatide having an iodine value approximately 10% lower attributable to hydroxylation than the corresponding unhydroxylated phosphatide.

6. A method of making bakery products of the class consisting of white bread, buns, rolls and coffee cake made from yeast raised doughs which comprises incorporating into such doughs a starchy polysaccharide containing at least 8% moisture intimately mixed with a hydroxylated phosphatide having an iodine value from 5% to 25% lower than the corresponding unhydroxylated phosphatide, the qunatity of said hydroxylated phosphatide being sufficient to increase the softness of the crumb texture but insufficient substantially to decrease the volume of the baked products.

References Cited in the file of this patent

UNITED STATES PATENTS

| | | |
|---|---|---|
| 1,831,728 | Working | Nov. 10, 1931 |
| 1,936,718 | Jordan | Nov. 28, 1933 |
| 1,971,886 | Votaw | Aug. 28, 1934 |
| 2,115,088 | Schweiger | Apr. 26, 1938 |
| 2,445,948 | Wittcoff | July 27, 1948 |
| 2,447,726 | Allingham | Aug. 24, 1948 |
| 2,513,638 | Glabe | July 4, 1950 |
| 2,629,662 | Julian | Feb. 24, 1953 |
| 2,632,705 | Scharf | Mar. 24, 1953 |
| 2,666,704 | Glabe | Jan. 19, 1954 |